June 7, 1966  D. R. BROSIOUS ET AL  3,255,356
LIGHT RESPONSIVE NON-CONTACT SHIELDING DEVICE
Filed May 1, 1961  4 Sheets-Sheet 2
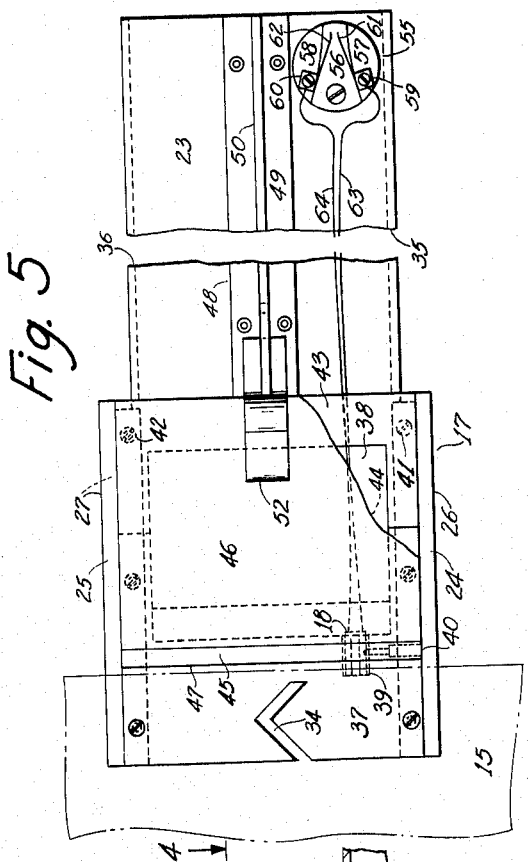
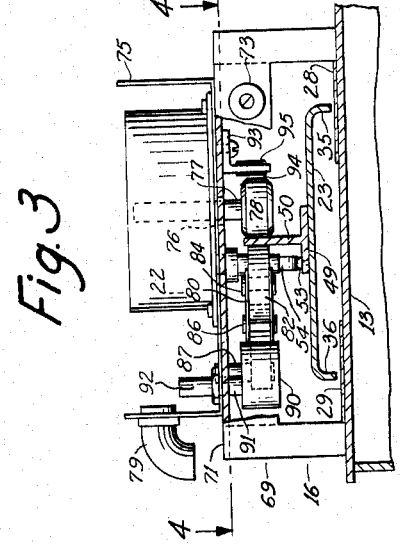
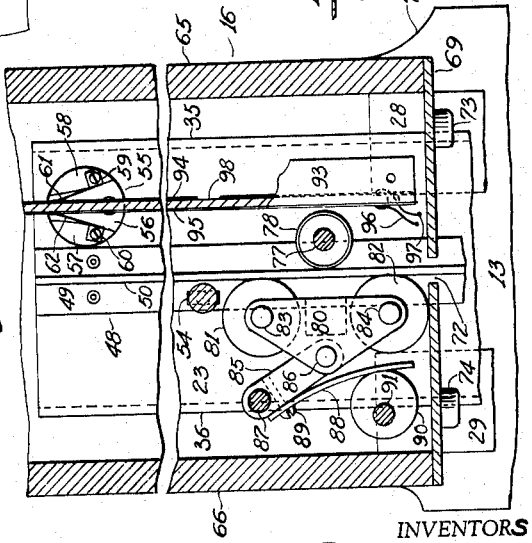
INVENTORS
Daniel R. Brosious
James S. Schwartz
David D. Doran
BY Natt M Emery Jr.
ATTORNEY INVENTORS
Daniel R. Brosious
James S. Schwartz
David D. Doran
BY Nat M Emery Jr.
ATTORNEY

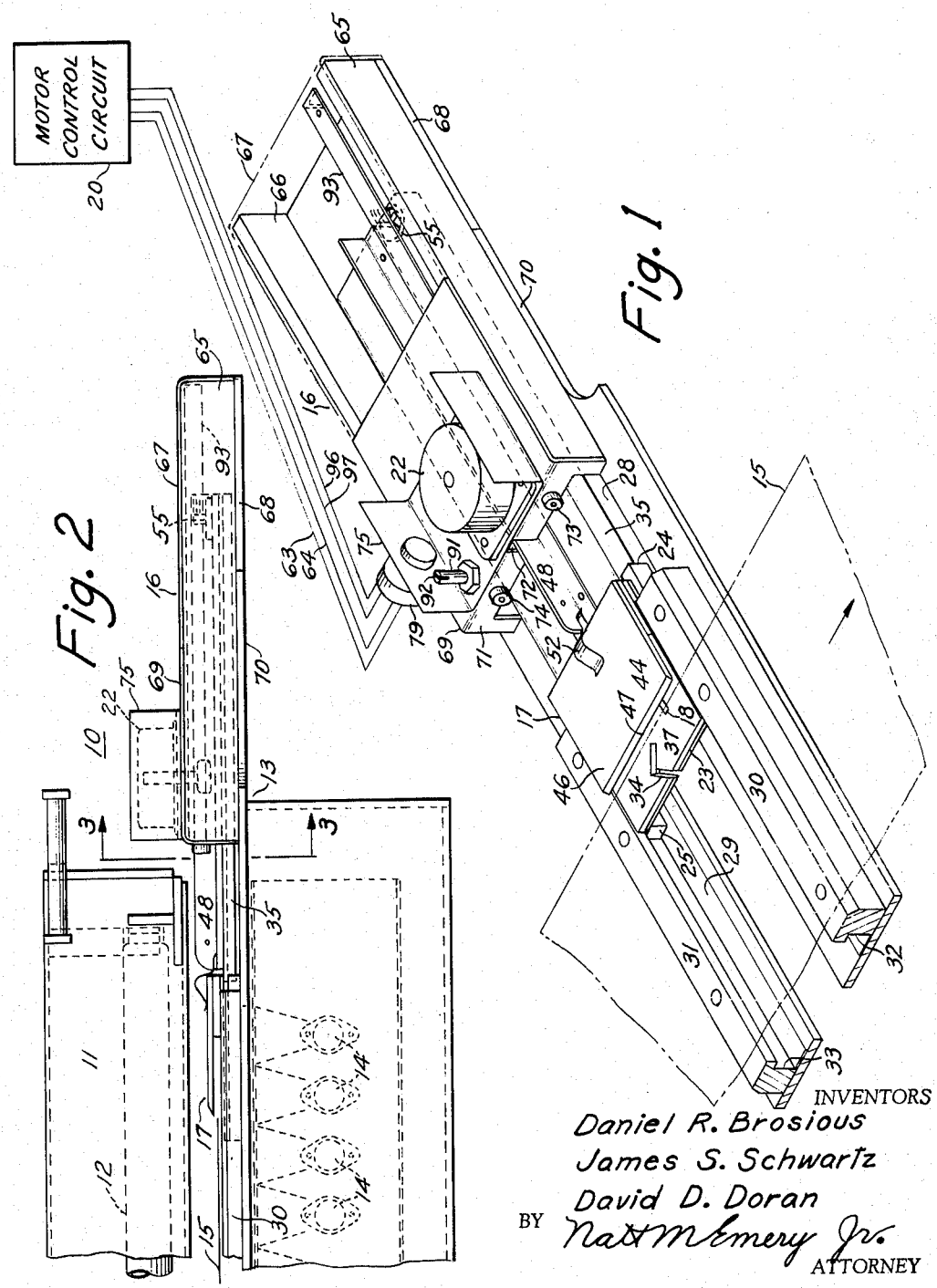

United States Patent Office 3,255,356
Patented June 7, 1966

3,255,356
LIGHT RESPONSIVE NON-CONTACT SHIELDING DEVICE
Daniel R. Brosious and James S. Schwartz, Bethlehem, Pa., and David D. Doran, Poughkeepsie, N.Y., assignors, by mesne assignments, to Bethlehem Steel Corporation, a corporation of Delaware
Filed May 1, 1961, Ser. No. 154,083
(Filed under Rule 47(a) and 35 U.S.C. 116)
5 Claims. (Cl. 250—219)

This invention relates to shielding means for use in connection with apparatus for detecting imperfections in moving strip by photoelectric means, and more particularly to noncontacting shielding means in which the shield, or shutter, continuously maintains a fixed position with respect to the position of the edge of the strip. The invention further relates to a novel motor control circuit for causing the shutter to maintain this fixed position with respect to the strip.

Metal strip, particularly strip which is subsequently to be coated with another metal, e.g. tin, is usually inspected for pinholes. Inspection is accomplished by means of a pinhole detector, which comprises a source of light positioned on one side of the strip and light-sensitive means positioned on the other side of the strip. Any light passing through the strip actuates the light-sensitive means, and pinholes are thereby detected.

Since the passage of light around the edges of the strip would cause the detector to falsely indicate the presence of pinholes, shielding means must be provided at each edge of the strip to prevent any light from striking the photo-sensitive means directly, i.e. without first passing through the strip. For reasons of accuracy, each shielding means must permit inspection of the strip to within a very small distance from the edge thereof. In addition, since there are generally slight variations in the width of the strip and the lateral motion of the strip may be considerable, particularly at high speeds, a further requirement for the shielding means is that the shutter continuously maintains a fixed position with respect to the edge of the strip.

To insure that the shutter continuously maintains a fixed position with respect to the edge of the strip, control means are necessary. That is, as the position of the edge of the strip varies with respect to the shutter, a control signal must be produced by this variation which causes motive power means to re-position either the shutter or the strip. The motor control circuit which actuates the motor in response to the control signal should be extremely sensitive to small variations in the control signal, in order that the strip may be accurately inspected. In addition, since the speed of the strip may be very high, the motor control circuit should respond very quickly to the control signal and rapidly actuate the motor. A further requirement of the motor control circuit is that any malfunction thereof will not result in damage to the strip.

Heretofore, shielding devices have either been fixed, and subject to the poor accuracy inherent in such devices, or have been of the contacting type, i.e. a portion of the device comes into contact with the edge of the moving strip. Devices of the latter type, while having a fairly high degree of accuracy, must frequently be replaced, since a metal strip moving at high speeds wears any surface in contact with its edges. Furthermore, physical considerations limit the speed at which the strip can be inspected to about 1000 f.p.m.

It is an object of this invention to provide a shielding device which permits inspection of moving strip to within a very small distance from its edges. A further object is to provide a shielding device in which no part thereof makes any contact whatsoever with the edge of the strip, and which permits moving strip to be accurately inspected at speeds up to 5000 f.p.m. or more.

An additional object of this invention is to provide an electrical-mechanical closed loop servo system in which a shield is continuously re-positioned at the edge of a moving strip in response to an input control signal which varies as the position of the shield with respect to the edge of the strip varies. It is a further object of this invention to provide a sensitive, quick-acting novel motor control circuit for actuating reversible motive power means in either direction in response to the variations in an input control signal.

Other objects will be more fully apparent from the following description taken in connection with the drawings, in which FIG. 1 is a fragmentary perspective view of the shielding means.

FIG. 2 is a side view of the shielding means in its normal position on a pinhole detector.

FIG. 3 is a sectional view along the lines 3—3 of FIG. 2, and FIG. 4 is a fragmentary view along the lines 4—4 of FIG. 3 showing the details of the drive assembly.

FIGS. 5 and 6 are enlarged plan and side views, respectively, of the shutter.

Figure 7:
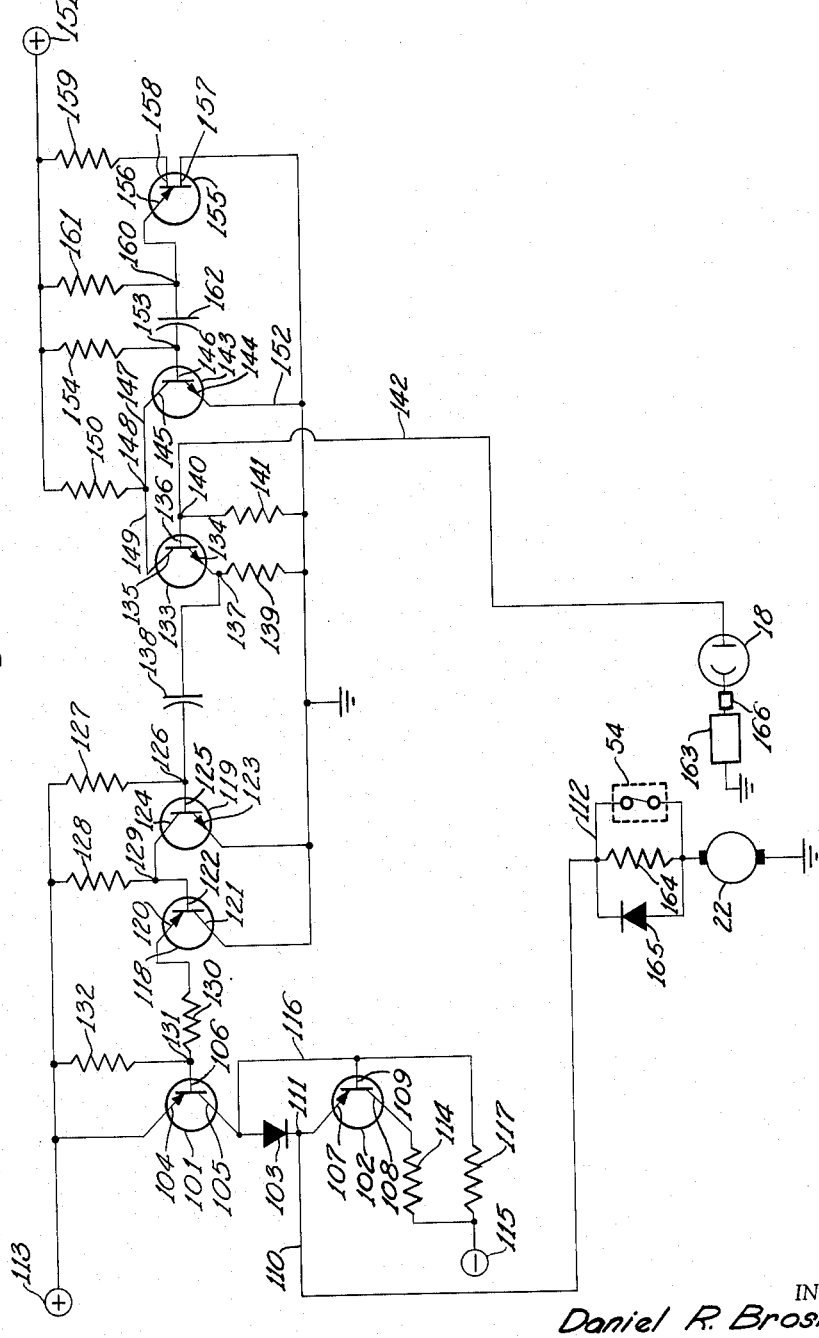
FIG. 7 is a schematic of the motor control circuit.

Referring more particularly to FIGS. 1 and 2, a pinhole detecting unit 10 comprising a detector head 11 containing a source of light, for example ultraviolet lamps 12, is positioned above a detector base 13 containing light-sensitive devices, for example, photomultiplier tubes 14, to permit the material to be inspected, herein illustrated as a moving strip 15 of metal, to pass therebetween. Mounted on each end of the detector base is a housing 16 containing the shield, or shutter, broadly designated as 17, and its drive assembly. Since both the mechanical components contained in each housing and the motor control circuit associated therewith are substantially identical, the description will be limited to the equipment utilized in shielding the light-sensitive devices from extraneous light at only one edge of the strip.

Generally speaking, the invention comprises a shutter 17 slidably mounted in a housing 16. Securely mounted in the front of the shutter 17 is a photoelectric cell 18. The photoelectric cell is electrically connected to a motor control circuit, designated in FIG. 1 as the dashed line square 20. The motor control circuit is in turn electrically connected to reversible motive power means, e.g. D.-C. torque motor 22, which is adapted to drive the shutter 17 transversely of the normal path of the strip 15.

To operate the device, the shutter 17 is initially driven inwardly by the D.-C. motor 22 until a portion of the photoelectric cell 18 is directly beneath the edge of the strip 15. This inward motion is caused by the relatively large quantity of light initially striking the cell, which in turn emits a relatively large output current which flows to the motor control circuit 20. The motor control circuit, the operation of which will be described in full detail later in the specification, causes the motor 22 to drive the shutter inwardly when a relatively large quantity of light strikes the photoelectric cell. The inward motion of the shutter ceases when the output current of the photoelectric cell decreases to a certain predetermined equilibrium value, which occurs when the edge of the strip prevents light from impinging upon the entire length of the cell, i.e. when the cell is only partially illuminated. The cell is so positioned on the shutter that no portion of the shielding device makes any contact whatsoever with the edge of the strip.

When the output current of the photoelectric cell is at its equilibrium value, the motor control circuit causes the D.-C. motor to develop no net torque, and the position of the shutter is thus fixed with respect to the position of the edge of the strip. As the relative positions of the edge of the strip and the shutter, and therefore the photoelectric cell, vary due to lateral motion of the strip and variations in the width thereof, the output current of the photoelectric cell varies correspondingly. The motor control circuit, in response to deviations from the equilibrium value of photoelectric cell output current, causes the reversible D.-C. motor to develop a net torque in the direction which re-positions the shutter with respect to the strip so that the equilibrium value of output current again flows from the photoelectric cell.

As shown in FIGS. 5 and 6, the shutter 17 broadly comprises a first shielding element having an inner edge extending beyond the edge of the strip 15 between the strip and the photomultiplier tubes 14. Mounted on said first shielding element is a second shielding element having an inner edge in close proximity to the edge of the strip. More specifically, the shutter 17 comprises a tail plate 23 which provides a base upon which the remaining components of the shutter are mounted. Mounted beneath the forward portion of the tail plate are bottom bars 24 and 25, to the outside and bottom sides of which are fastened strips 26 and 27 of any material having a low coefficient of friction, e.g. Teflon. Similar strips 28 and 29 of substantially frictionless material are fastened lengthwise along the bed of the detector base 13, and are disposed so that the bottoms of the bottom bars make contact therewith during movement either inwardly or outwardly by the shutter. Rigidly mounted on the bed of the detector base are guide bars 30 and 31 having notches 32 and 33, respectively, which serve to guide the shutter and prevent lateral motion thereof. The forward portion of the tail plate is provided with a V-shaped cut 34 so that the strip may be accurately inspected to within a small distance from its edges. The sides of the rear portion of the tail plate are bent downwardly to form flanges 35 and 36 which prevent light from passing under the tail plate and actuating the photomultiplier tubes 14.

Rigidly mounted on the front portion of the tail plate is the main body plate 37. The forward portion thereof is provided with a V-shaped cut disposed to coincide with the cut 34 directly beneath it. A rectangular opening 38 in plate 37 provides the base for an effective blackbody to absorb any reflected light, as well as providing an enclosure from which the photoelectric cell 18 can be inserted into its housing 39. The cell housing comprises a V-notch cut into the forward portion of the main body plate, and having openings at the top and bottom thereof. The cell is rigidly mounted in its housing by providing a pressure adjustment screw 40 which extends inwardly from the side of the main body plate and contacts the side of the photoelectric cell. Positioning screws 41 and 42 are mounted in the rear of the main body plate and provide studs upon which a C-shaped spacer plate 43 is semi-permanently mounted. The spacer plate provides a base for the cover support 44, which is permanently attached to the spacer plate by glue, for example. The cover support is rectangular and has a chamfered forward edge 45 and a rectangular opening disposed directly above the opening 38 in the main body plate 37. A cover 46 is mounted on the cover support to prevent extraneous light from entering the enclosure within the shutter. The forward edge of the cover 47 terminates directly above the center of the photoelectric cell housing and permits only vertical light from the ultraviolet lamps 12 to impinge upon cell 18.

It is to be understood that substantially all surfaces which are in the vicinity of the photoelectric cell 18 or the photomultiplier tubes 14 should be coated with a light-absorbing black paint. In particular, the interior surfaces of the enclosure formed by the plates mounted at the forward portion of the shutter should be coated with black paint. Any light which may be reflected into this enclosure is effectively absorbed.

Mounted on the rear portion of the tail plate 23 and extending lengthwise along the center thereof is a T-bar 48 comprising a base 49 and a vertical section 50. The forward end of the vertical section is rounded and contains a slot 51 adapted to receive spring 52, which exerts a downward pressure against the spacer plate and the components permanently attached thereto, thereby maintaining them firmly compressed against the main body plate. Herein lies a safety feature of the device. Should the moving strip accidentally become entangled in the shutter, the semi-permanent portion thereof is easily knocked from its position, and there is little or no damage to the remainder of the device. For additional safety, the semi-permanent portion of the shutter may be chained or otherwise attached to the housing to limit its flight, should it be struck by the moving strip.

A button head cap screw 53 is mounted on the base 49 of T-bar 48 and serves as a cam to actuate limit switch 54, which depends from the roof of the housing 16. Rigidly mounted at the rear of the tail plate is a sliding contact assembly, broadly designated as 55, comprising a base of insulating material 56 covered with two strips of copper foil 57 and 58. Contact brackets 59 and 60 are mounted on strips of copper foil 57 and 58, respectively. Contact strips 61 and 62 are spot welded to the vertical sections of contact brackets 59 and 60, respectively. Electrical conductors 63 and 64 are disposed along the tail plate parallel to the T-bar and provide an electrical path between the strips of copper foil 57 and 58 and the photoelectric cell 18.

The shutter housing 16 broadly comprises side plates 65 and 66, cover 67, bottom plate 68, and motor mounting bracket 69. The housing 16 is mounted on the detector base extension 70. The motor mounting bracket 69 is rigidly attached to the top surfaces of side plates 65 and 66, and has its forward section 71 bent downwardly along the front walls of said side plates. Forward section 71 is provided with a slot 72 through which the vertical section 50 of T-bar 48 passes during inward or outward movement of shutter 17. Rubber stops 73 and 74 are mounted on section 71 and serve to protect the semi-permanent portion of the shutter from damage during retraction of the shutter. Mounted on the motor mounting bracket is the motor housing 75, which provides a base for the motor 22. The shaft 77 and drive wheel 78 of the motor 22 pass through a circular opening 76 disposed in the bottom of the motor housing and extending through the motor mounting bracket 69 into the shutter housing. Mounted on one wall of the motor housing is a conduit 79 through which the electrical conductors connecting the motor 22 and the photoelectric cell 18 to the motor control circuit 20 are passed. A cover for the motor housing may of course be provided.

A hinge plate assembly, shown in detail in FIGS. 3 and 4, is disposed below the motor mounting bracket and comprises a hinge plate 80 to which are pinned guide rollers 81 and 82 by pins 83 and 84, respectively. The hinge plate is rotatably mounted on spring bar 85 by pin 86, and the spring bar is rotatably mounted on the spring bar stud 87. The upper portion of the shank of the spring bar stud is threaded and passes through the motor housing 75 and motor mounting bracket 69 and is bolted thereto. The spring 88 is attached to the spring bar 85 by screw 89, and a cam wheel 90 having an off-center shaft 91 is disposed so that it makes circumferential contact with the free end of the spring. The shaft 91 of the cam wheel passes through the motor mounting bracket and is mounted on the motor housing. A slotted surface 92 is provided at the top of the shaft so that it can be rotated.

The hinge plate assembly operates in combination within the drive wheel 78 of motor 22 to drive the shutter 17 inwardly and outwardly. The vertical section 50 of T-bar 48 is engaged in frictional contact between drive wheel 78 and guide rollers 81 and 82. The pressure exerted by the drive wheel and the guide rollers against section 50 may be varied by rotating the shaft 91 of cam wheel 90.

An L-bar 93 is mounted on the motor mounting bracket and extends lengthwise along the entire roof of the shutter housing 16. Strips 94 and 95 of insulating material having copper foil secured to the outer surfaces thereof are fastened along each side of the vertical section of the L-bar, thereby providing a conducting surface with which the contact strips 61 and 62 of the sliding contact assembly 55 make continuous electrical contact as the shutter moves inwardly or outwardly. Electrical conductors 96 and 97 are soldered to the strips 94 and 95 and pass through openings (not shown) in the motor mounting bracket 69 and motor housing 75 to the conduit 79, and therethrough to the motor control circuit 20. A small section of copper foil is removed from one of the strips of insulating material at the forward portion of the L-bar to provide a non-conducting surface 98 which limits the distance the shutter 17 can move in the forward direction. That is, when the shutter reaches its forwardmost position, as determined by mechanical considerations, contact strip 61 contacts surface 98, thereby opening the photoelectric cell circuit and preventing further inward movement of the shutter.

The motor control circuit 20 broadly comprises the four following functional circuits: (1) an output power stage, (2) driver or amplifier stages; (3) a height to width converter; (4) a pulse generator. The output power stage comprises power transistors 101 and 102 and a junction diode 103. Transistor 101 is of the p-n-p type and has an emitter electrode 104, a collector electrode 105, and a base electrode 106. Transistor 102 is also of the p-n-p type and has an emitter electrode 107, a collector electrode 108, and a base electrode 109. Transistors 101 and 102 function like a pair of interlocked single pole switches connected so that when one switch is open, the other switch is closed. That is, when transistor 101 is in saturated conduction, transistor 102 is cut off, and vice versa. A conductor 110 connects the junction 111 of diode 103 and the emitter 107 of transistor 102 to conductor 112 and, assuming limit switch 54 is closed, to one side of the motor 22, the other side of the motor being connected to ground. Connected in parallel with limit switch 54 is a resistor 164 and a junction diode 165. Connected to the emitter 104 of transistor 101 is a source 113 of positive D.-C. potential, e.g. +24 volts. Connected through bias resistor 114 to the collector 108 of transistor 102 is a source 115 of negative D.-C. potential equal in magnitude to that of source 113, e.g. −24 volts.

If it is assumed that transistor 101 is initially in saturated conduction, current flows from positive source 113 through transistor 101. The collector current leaves the collector 105 and flows substantially unimpeded through diode 103, which is forward biased to the collector current from transistor 101, to junction 111. The base 109 of transistor 102 is connected to the positive side of diode 103 by conductor 116 and the emitter 107 is connected to the negative side thereof, so that the small voltage drop across the diode 103 when the saturated collector current of transistor 101 flows therethrough suffices to reverse bias transistor 102 beyond cut-off.

If transistor 101 is cut off, only leakage current flows in the base circuit thereof, and the collector current is quite small. The voltage drop across diode 103 is therefore negligible, and transistor 102 is no longer reverse biased. Sufficient current is supplied to the base 109 through resistor 117 to drive transistor 102 into saturation.

The operation of the output power stage is predicated upon the low forward impedance of junction diodes and the switching properties of transistors, as is well known in the art. That is, both a forward biased junction diode and a transistor in saturated conduction may be considered substantially short circuits. Thus, when transistor 101 is in saturated conduction and transistor 102 is cut off, current flows substantially unimpeded from positive source 113 through transistor 101 and diode 103 directly into motor 22, and the positive D.-C. voltage at source 113 is, for all practical purposes, directly across the motor 22. Similarly, when transistor 101 is cut off and transistor 102 is in saturated conduction, current flows substantially unimpeded from motor 22 through transistor 102 into negative source 115, and the negative D.-C. voltage at source 115 is, for all practical purposes, directly across the motor 22. Since transistors 101 and 102 are interlocked, power is continuously supplied to motor 22.

Figure 8:
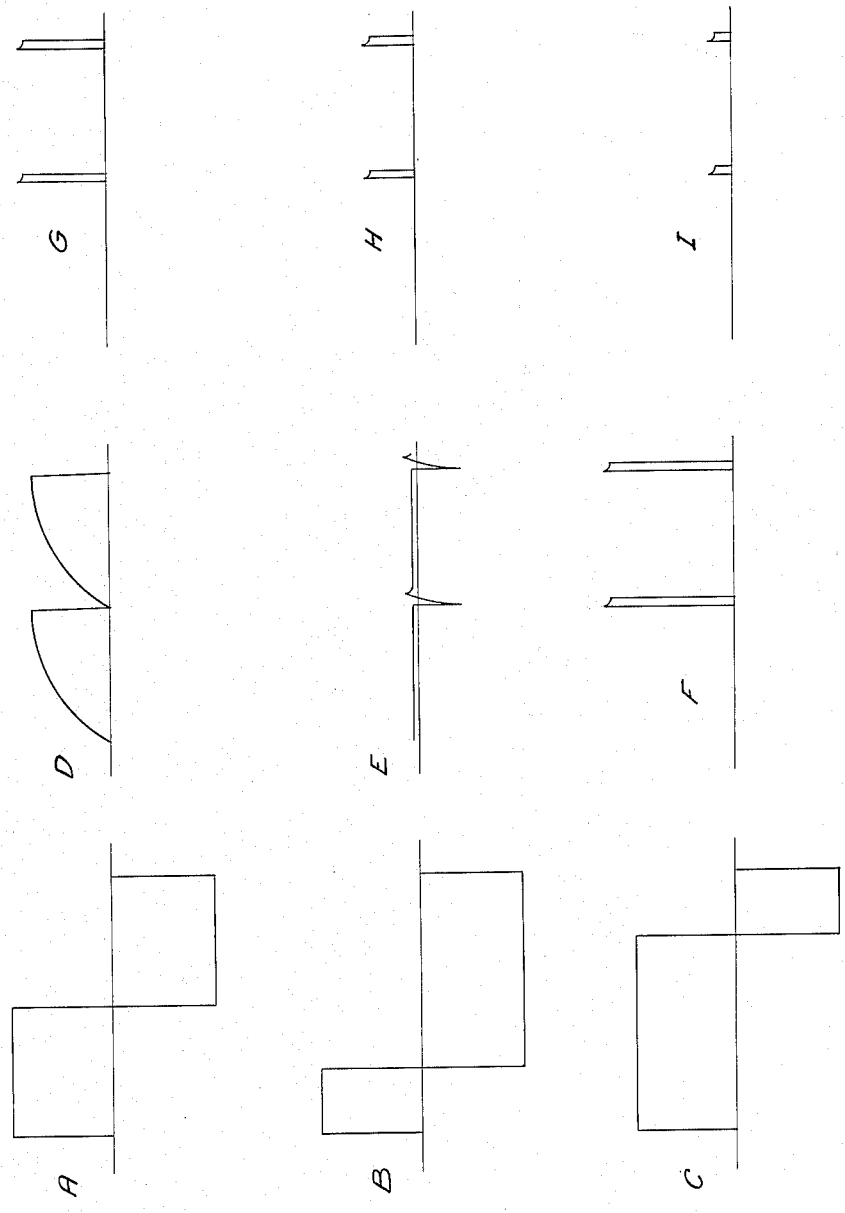
FIG. 8 shows graphically the wave forms of the voltages at various points in the circuit.

Transistors 101 and 102 are alternatively driven into saturation at a predetermined frequency, e.g. 500 cycles per second. If each transistor is driven into saturated conduction for 50% of each cycle, the positive and negative D.-C. voltage sources 113 and 115 are alternately placed across the motor 22 for equal periods of time by the switching action of said transistors. Provided the frequency of switching is sufficiently high, the shaft 77 of motor 22 will not rotate, since the torque developed is of insufficient magnitude to overcome the mechanical inertia of the motor and its load. The equilibrium condition, i.e. the condition in which transistors 101 and 102 are driven into saturated conduction for 50% of each cycle, occurs when the shutter 17 is properly positioned with respect to the edge of the moving strip as determined by the quantity of light striking photoelectric cell 18. The voltage waveform across the motor at equilibrium is shown graphically in FIG. 8(A). Should the shutter 17 be momentarily improperly positioned, a greater or lesser quantity of light will impinge upon the photoelectric cell 18, and transistors 101 and 102 will no longer be in saturated conduction for 50% of each cycle. FIGURES 8(B) and 8(C) show the voltage waveform across the motor 22 during such non-equilibrium conditions. During non-equilibrium conditions, one of the D.-C. voltage sources 113 and 115 is across the motor for a majority of each cycle, and a net torque is developed by the motor 22 which causes the shaft 77 to rotate in such a direction that shutter 17 is re-positioned in its equilibrium position. The direction and magnitude of the torque developed depends upon the quantity of light striking the photoelectric cell 18.

The driver or amplifier stages comprise p-n-p transistor 118 and n-p-n transistor 119 and serve to reverse bias transistor 101 in response to an input control signal dependent upon the output current from cell 18. Transistor 118 has an emitter electrode 120, a collector electrode 121, and a base electrode 122. Transistor 119 has an emitter electrode 123, a collector electrode 124, and a base electrode 125. Transistors 119, 118, and 101 are directly coupled to each other so that when transistor 119 is in saturated conduction, transistors 118 and 101 are in saturated conduction, also. Similarly, when transistor 119 is cut off, transistors 118 and 101 are cut off, also. In other words, the state of conduction of transistor 119 determines the state of conduction of transistors 118, 101, and because transistors 101 and 102 are interlocked, 102.

The base 125 of transistor 119 is connected to junction 126. In the absence of a negative potential at junction 126, transistor 119 is in saturated conduction due to the current supplied to its base 125 through resistor 127. Current then flows from source 113 through resistor 128 and through transistor 119 to ground. The base 122 of transistor 118 is connected to resistor 128 at junction 129. The voltage drop across resistor 128 when transistor 119 is in saturated conduction causes the potential at junction 129 to become less positive, and thereby provides forward bias to transistor 118. The collector 124 of transistor 119 supplies sufficient base current to the base 122 of transistor 118 to drive it into saturated conduction. Connected between the emitter 120 of transistor 118 and the base 106 of transistor 101 is a current limiting resistor 130, which limits the emitter current of the transistor 118 to a safe value. At the junction 131 of resistor 130 and base 106, a resistor 132 is connected to source 113. Current flows from source 113 through resistors 132 and 130 through transistor 118 to ground. The voltage drop across resistor 132 when transistor 118 is in saturated conduction causes the potential at junction 131 to become less positive, and thereby provides sufficient forward bias to transistor 101 to drive it into saturated conduction. As previously explained, transistor 102 is cut off when transistor 101 is in saturated conduction.

A negative potential at junction 126 suffices to reverse bias transistor 119 beyond cut off. The potential at junction 129 then becomes more positive, since there is a very small voltage drop across resistor 128 when transistor 119 is cut off. This increase in potential at junction 129 cuts off transistor 118. The potential at junction 131 then becomes more positive, since the voltage drop across resistor 132 is very small when transistor 118 is cut off. The increase in potential at junction 131 cuts off transistor 101, thereby permitting transistor 102 to be driven into saturated conduction.

It can be seen from the foregoing that the presence of a negative potential at junction 126 for 50% of each cycle causes the sources of positive and negative potential 113 and 115, respectively, to be alternatively placed across motor 22 for equal periods of time. Such a condition prevails when the shutter 17 is properly positioned with respect to the edge of the strip 15, and no torque is developed by the motor 22. Furthermore, it can be seen that by varying the percentage of each cycle during which a negative potential is present at junction 126, either the positive source 113 or the negative source 115 will be placed across the motor 22 for more than 50% of each cycle. This condition prevails when the shutter 17 is improperly positioned with respect to the edge of the strip 15, and a net torque is developed by the motor 22 which repositions the shutter 17 in its equilibrium position.

The output current from the photoelectric cell 18, in response to the quantity of light impinging upon it, determines the percentage of each cycle during which a negative potential is present at junction 126 by means of circuitry now to be described. An n-p-n transistor 133 has an emitter electrode 134, a collector electrode 135, and a base electrode 136. The emitter 134 is connected to junction 137, and a capacitor 138 is connected between junctions 137 and 126. A load resistor 139 is connected between junction 137 and ground. Connected to the base 136 at a junction 140 is a leak resistor 141. Also connected at junction 140 by conductor 142 is the photoelectric cell 18.

An n-p-n transistor 143 having an emitter electrode 144, a collector electrode 145, and a base electrode 146 has its collector 145 connected by conductor 147 to a junction 148 which is connected to collector 135 of transistor 133 by conductor 149. A resistor 150 is connected between junction 148 and a source 151 of regulated positive D.-C. potential, e.g. +24 volts. The emitter 144 of transistor 143 is connected to ground by conductor 152. Connected to the base 146 of transistor 143 at junction 153 is a resistor 154 which connects the base 146 to source 151.

A uninjunction transistor 155 having an emitter electrode 156 and first and second base electrodes 157 and 158, respectively, has its base 157 connected to ground and its base 158 connected to source 151 through resistor 159. Connected to the emitter 156 at junction 160 is a resistor 161 which connects the emitter 156 to source 151. Connected between junctions 160 and 153 is a capacitor 162.

The operation of the circuits is substantially as follows. Transistor 155 operates in conjunction with resistor 161 and capacitor 162 to produce a sawtooth wave voltage, shown in FIG. 8(D), at junction 160. As is well known in the art, the interbase resistance of transistor 155 is dependent upon its emitter current. This resistance is very high until the voltage between the emitter 156 and the base 158 reaches a "firing potential," which is approximately two-thirds the voltage between base 157 and base 158, at which time the emitter current flows, and the resistance of base 157 rapidly decreases to a low value. As the resistance of base 157 decreases, the voltage at the emitter 156 also decreases until it is below a minimum or cut-off value, at which time base 157 returns to its high resistance state and the emitter current ceases to flow.

If it is assumed that the power is just turned on, negligible current flows through transistor 155, since the voltage at its emitter 156 is zero. The emitter voltage increases as capacitor 162 charges through resistor 161 and the base-emitter circuit of transistor 143. During this portion of the cycle, i.e. the time during which the voltage at junction 160 is increasing, the charging current through the base-emitter circuit of transistor 143 provides sufficient forward bias to maintain transistor 143 in saturated conduction. Junction 153 is essentially at ground potential, since the voltage drop from the base 146 to the emitter 144 is negligible during saturation. When the voltage at the emitter 156 reaches the firing potential, the resistance of base 157 rapidly decreases to a low value, and the positive charge stored in capacitor 162 rapidly discharges through the emitter 156 and base 157 to ground until the emitter voltage decreases to below the cut-off value.

Since the voltage across a capacitor cannot change instantaneously and the voltage at junction 160 has decreased almost instantaneously, the voltage at junction 153 must instantaneously decrease an equal amount. Because the voltage at junction 153 was approximately at ground potential during the charging cycle of capacitor 162, it must decrease below ground potential at the start of the discharging cycle of capacitor 162. The negative voltage at junction 153 cuts off transistor 143 until said voltage can discharge, the discharge time being primarily a function of capacitor 162 and resistor 154. The value of resistor 154 should be such that transistor 143 is cut off for about 10% of each cycle, although other values may, of course, be permissible. The waveform of the voltage at junction 153 is shown in FIG. 8(E).

As previously pointed out, when transistor 143 is in saturated conduction the voltage drop across it is negligible. Since transistor 133 is in series with resistor 139 and the combination is in parallel with transistor 143, transistor 133 and resistor 139 are shorted out during that period of each cycle during which transistor 143 is in saturated conduction. When transistor 143 is cut off, the voltage at junction 148 is nearly equal to that of the source 151, and current may flow through transistor 133. The waveform of the voltage at junction 148 is shown in FIG. 8(F).

The photoelectric cell 18 is connected to an adjustable voltage supply, broadly designated as 163, which is adjusted to cause the photoelectric cell to supply adequate forward bias through conductor 142 to the base 136 of transistor 133 when the cell is fully illuminated. When the system is operating, the base bias varies from a few microamperes to about four hundred microamperes at full illumination. The magnitude of the current through transistor 133 is modulated by the magnitude of the base bias. From the foregoing discussion, it can be seen that the voltage at junction 137 is a series of narrow pulses, each having an amplitude dependent upon the quantity of light striking the photoelectric cell 18. The waveform of this voltage is shown in FIG. 8(G), (H), and (I) for three varying degrees of light. FIG. 8(G) shows the voltage when there is too much light striking the cell. FIG. 8(H) shows the voltage when the equilibrium value of light is striking the cell, and FIG. 8(I)

shows the voltage when there is too little light striking the cell.

Transistor 119, which was previously considered in the driver stages, operates in conjunction with capacitor 138 and transistor 133 to convert the pulses of varying amplitude and constant width at junction 137 to pulses of varying width and constant amplitude at junction 131. When a pulse arrives at junction 137 the capacitor 138 rapidly charges through resistor 150, transistor 133, and the base-emitter circuit of transistor 119. Since transistor 119 is in saturated conduction because of the forward bias supplied to its base 125 through resistor 127, junction 126 remains at approximately ground potential. When the trailing edge of the pulse arrives, i.e. when transistor 133 is cut off by the short circuiting action of transistor 143, the current through resistor 139 decreases instantaneously to a value determined by the impedance of the discharging circuit of capacitor 138, i.e. the series impedance of resistor 127, capacitor 138, and resistor 139. The resistance of resistor 127 is large compared to that of resistor 139, and the voltage at junction 137 therefore decreases instantaneously to a value slightly above ground potential. Since the total voltage across capacitor 138 cannot change instantaneously, the voltage at junction 126, which was previously slightly above ground potential, must instantaneously decrease by an amount equal to the decrease in voltage at junction 137. The voltage at junction 126 thus becomes negative until capacitor 138 can discharge through resistors 127 and 139.

The negative voltage at junction 126 suffices to reverse bias transistor 119 beyond cut-off. The percentage of each cycle during which transistor 119 is cut off depends upon the magnitude of the voltage at junction 126, which in turn depends upon the magnitude of the voltage at junction 137. The latter voltage depends upon the emitter current of transistor 133, which is dependent upon the quantity of light impinging upon the photoelectric cell 18. The values of resistor 127 and capacitor 138 are chosen so that when the cell 18 is fully illuminated the RC time constant is long enough to keep transistor 119 reversed biased beyond cut-off until another pulse arrives at the emitter 134 of transistor 133. With less than maximum illumination of cell 18, transistor 119 is cut off for a proportionately shorter period of time. For example, when the illumination is such that the equilibrium value of output current flows from the cell, i.e. when the shutter 17 is properly positioned with respect to the edge of the strip 15, transistor 119 is reverse biased beyond cut-off for 50% of each cycle.

The invention operates in substantially the following manner. The motor 22 is connected to conductor 112 with its polarity such that when transistor 101 is conducting, the shaft 77 tends to rotate in a direction which would cause the shutter 17 to be driven outwardly, i.e. away from the strip. When transistor 102 is conducting, the shaft 77 tends to rotate in a direction which would cause the shutter 17 to be driven inwardly, i.e. toward the strip.

Prior to operating the device, voltage supply 163 is adjusted so that there is no output current flowing from the photoelectric cell 18 to the base 136 of transistor 133. The system is now energized, and the shutter is immediately driven to its fully retracted position since there is no input signal to prevent transistor 101 from conducting for the entire cycle. In its fully retracted position, the head of screw 53 mounted on the base 49 of T-bar 48 contacts and opens limit switch 54, throwing the parallel combination of junction diode 165 and resistor into the circuit. Current entering the motor 22 is thus confronted with the high impedance of the diode 165, which is reverse biased, and resistor 164, and is of insufficient magnitude to cause the shaft 77 of motor 22 to rotate. Current from the motor passes easily through diode 165, which is forward biased, and thus is substantially unaffected by the opening of the limit switch 54.

Voltage supply 163 is now adjusted until the cell 18 is supplying sufficient current to advance the shutter 17 to the edge of the strip 15 without any oscillatory motion. The shutter 17 may be retracted at any time by opening a relay 166 which opens the photoelectric cell circuit.

After voltage supply 163 has been adjusted, relay 166 is opened and the shutter 17 is driven to its fully retracted position. To begin inspection of the strip 15, relay 166 is closed, thereby closing the photoelectric cell circuit. Since the cell 18 is fully exposed to the light emitted from lamps 12, a large output current flows from cell 18 to the base 136 of transistor 133. The current impulses at junction 137 are therefore very large, and the voltage drop at juncton 126 when the trailing edge of the pulse arrives at junction 137 is sufficient to cut off transistor 101 for the entire cycle. Transistor 102 is therefore in saturated conduction for the entire cycle, and current flows from the motor 22 through transistor 102 to the negative D.C. source 115. The shaft 77 of motor 22 develops a high torque which drives the shutter 17 inwardly until a portion of the cell 18 is no longer illuminated by light from lamps 12. Movement of the shutter stops when the output current from cell 18 is just sufficient to reverse bias transistor 101 beyond cut-off for 50% of each cycle.

As the amount of light impinging upon the photoelectric cell 18 varies due to lateral motion of the strip and variations in the width thereof, the output current from cell 18 varies correspondingly and, by means of the motor control circuit 20, causes motor 22 to re-position shutter 17 accurately with respect to the edge of the strip. At no time does any portion of the shielding device make contact with the edge of the strip.

The aforementioned motor control circuit has several safety features incorporated therein, so that the most common malfunctions thereof will not result in damage to the strip. For example, since the most common failure of transistors and diodes is shorting within the semiconductor material, the circuit has been designed so that the shutter will be immediately retracted should shorting in any one of transistors 101, 118, 119, 133, 143, 155, or diode 103. In addition, any open circuit in the photoelectric cell circuitry or at the sliding contact assembly causes the shutter to be immediately retracted. Failure of the light source produces a similar result.

In one successful embodiment of the circuit shown in FIG. 7, the following components were utilized:

Resistor 114 _____ 5 ohm.
Resistor 117 _____ 125 ohm.
Resistor 127 _____ 100K ohm.
Resistor 128 _____ 4.7K ohm.
Resistor 130 _____ 270 ohm.
Resistor 132 _____ 15 ohm.
Resistor 139 _____ 10K ohm.
Resistor 141 _____ 150K ohm.
Resistor 150 _____ 2.2K ohm.
Resistor 154 _____ 4.7K ohm.
Resistor 159 _____ 330 ohm.
Resistor 161 _____ 47K ohm.
Resistor 164 _____ 40 ohm.
Capacitor 138 _____ .1 mfd.
Capacitor 162 _____ .05 mfd.
Diodes 103, 165 _____ Type 40-H.
Transistors 101, 102 ____ Type 2N278–DS501–2N1100.
Transistor 118 _____ Type 2N1125.
Transistor 119 _____ Type 2N1012.
Transistor 133 _____ Type 2N78–2N35.
Transistor 143 _____ Type 2N356-A.
Transistor 155 _____ Type 2N491.

It is to be understood that the values for the circuit components may vary according to the design for any particular application. The foregoing specifications were given for the purpose of example only, and are suitable for operations in which the control circuit has a repetition rate of 500 pulses per second.

The aforementioned motive power means utilized to drive the shutter should preferably be a D.-C. torque motor. Because of the high output torque to inertia ratio that is possible, and also because of the small input power required to obtain a given torque, such a motor is ideally suited for use in the instant device. A further advantage lies in the very fast torque vs. time response inherent in D.-C. torque motors.

Changes and modifications of this invention will undoubtedly occur to those skilled in the art and we therefore do not wish to be limited to the exact embodiments shown and described but may use such substitutions, modifications or equivalents thereof as are embraced within the scope of our invention or as pointed out in the claims.

We claim:

1. In apparatus for detecting holes in moving strip, said apparatus comprising a light source positioned on one side of said strip and light-sensitive means substantially aligned with said source and positioned on the other side of said strip, means for preventing light from passing around an edge of said strip and impinging upon said light-sensitive means, comprising:
   (a) a light-shielding device positioned adjacent, but out of contact with, an edge of said strip,
   (b) said device comprising a shutter adapted to be driven in a direction transverse to the path of the moving strip,
   (c) said shutter comprising a first shielding element having an inner edge extending beyond said edge of the strip between said strip and said light-sensitive means, and a second shielding element, mounted on said first shielding element and having an inner edge in close proximity to said edge of the strip,
   (d) a slot in said first shielding element extending from the inner edge of said first shielding element to a point disposed slightly inwardly from a point substantially vertically aligned with the inner edge of said second shielding element,
   (e) light-sensing means, mounted on said first shielding element in substantially vertical alignment with the inner edge of said second shielding element, to receive light from said source which passes between the inner edge of said second shielding element and said edge of said strip,
   (f) drive means in operative connection with said shutter for driving said shutter,
   (g) reversible motive power means in operative connection with said drive means and adapted to actuate said drive means, and
   (h) control means, connecting said light-sensing means to said reversible motive power means, for energizing said reversible motive power means in response to the quantity of light striking said light-sensing means to maintain the position of said shutter in relation to said edge of said strip.

2. In apparatus for detecting holes in moving strip, said apparatus comprising a light source positioned on one side of said strip and light-sensitive means substantially aligned with said source and positioned on the other side of said strip, means for preventing light from passing around an edge of said strip and impinging upon said light-sensitive means, comprising:
   (a) a light-shielding device positioned adjacent, but out of contact with, an edge of said strip,
   (b) said device comprising a shutter adapted to be driven in a direction transverse to the path of the moving strip,
   (c) said shutter comprising a first shielding element having an inner edge extending beyond said edge of the strip between said strip and said light-sensitive means, and a second shielding element, mounted on said first shielding element and having an inner edge in close proximity to said edge of the strip,
   (d) a slot in said first shielding element extending from the inner edge of said first shielding element to a point disposed slightly inwardly from a point substantially vertically aligned with the inner edge of said second shielding element,
   (e) light-sensing means, mounted on said first shielding element in substantially vertical alignment with the inner edge of said second shielding element, to receive light from said source which passes between the inner edge of said second shielding element and said edge of said strip,
   (f) means, including said first and second shielding elements, forming a light-absorbing enclosure having an entrance closely adjacent to said edge of said strip,
   (g) drive means in operative connection with said shutter for driving said shutter,
   (h) reversible motive power means in operative connection with said drive means and adapted to actuate said drive means, and
   (i) control means, connecting said light-sensing means to said reversible motive power means, for energizing said reversible motive power means in response to the quantity of light striking said light-sensing means to maintain the position of said shutter in relation to said edge of said strip.

3. A device as recited in claim 1, in which said second shielding element is disposed in substantially the same plane as the plane of the moving strip.

4. In apparatus for detecting holes in moving strip, said apparatus comprising a light source positioned on one side of said strip and light-sensitive means substantially aligned with said source and positioned on the other side of said strip, means for preventing light from passing around an edge of said strip and impinging upon said light-sensitive means, comprising:
   (a) a light-shielding device positioned adjacent, but out of contact with, an edge of said strip,
   (b) said device comprising a shutter adapted to be driven in a direction transverse to the path of the moving strip,
   (c) said shutter comprising a first shielding element having an inner edge extending beyond said edge of the strip between said strip and said light-sensitive means, and a second shielding element, mounted on said first shielding element and having an inner edge in close proximity to said edge of the strip,
   (d) a slot in said first shielding element extending from the inner edge of said first shielding element to a point disposed slightly inwardly from a point substantially vertically aligned with the inner edge of said second shielding element,
   (e) light-sensing means, mounted on said first shielding element in substantially vertical alignment with the inner edge of said second shielding element, to receive light from said source which passes between the inner edge of said second shielding element and said edge of said strip,
   (f) drive means in operative connection with said shutter for driving said shutter,
   (g) a D.C. torque motor in operative connection with said drive means and adapted to actuate said drive means, and
   (h) control means, connecting said light-sensing means to said D.C. torque motor, for continuously energizing said D.C. torque motor in response to the quantity of light striking said light-sensing means to maintain the position of said shutter in relation to said edge of said strip.

5. A device as recited in claim 4, in which said control means comprises:
   (1) first and second sources of direct voltage, the second source being opposite in polarity and equal in magnitude to the first source, (2) switching means, adapted to connect said D.C. torque motor to one or the other of said sources, comprising first and second switching devices interlocked so that when one of said devices is open, the other is closed, and means maintaining said first switching device in the closed condition in the absence of an input signal, and (3) circuit means, connected to said light-sensing means, periodically supplying an input signal to said switching means which opens said first switching device for a period of time dependent upon the intensity of the light impinging upon said light-sensing means.

References Cited by the Examiner

UNITED STATES PATENTS

| Re. 25,671 | 10/1964 | Larew et al. | 250—219 |
|---|---|---|---|
| 2,395,181 | 2/1946 | Hags | 250—219.1 |
| 2,820,908 | 1/1958 | Linderman | 250—219.1 X |
| 2,884,580 | 4/1959 | Sauter et al. | 318—283 |
| 2,886,716 | 5/1959 | Camp | 250—219.1 |
| 2,892,951 | 6/1959 | Linderman | 250—219.1 |
| 2,941,087 | 6/1960 | Blumberg et al. | 250—219.1 |
| 2,981,845 | 4/1961 | Larew et al. | 250—219.1 |
| 2,994,813 | 8/1961 | Towener et al. | 318—283 |

RALPH G. NILSON, *Primary Examiner.*

WALTER STOLWEIN, *Examiner.*